(12) United States Patent
Vlismas

(10) Patent No.: US 7,357,607 B2
(45) Date of Patent: Apr. 15, 2008

(54) TOOL HOLDER

(75) Inventor: Peter Vlismas, Peabody, MA (US)

(73) Assignee: PV Engineering & Mfg., Inc., No. Billerica, MA (US)

( * ) Notice: Subject to any disclaimer, the term of this patent is extended or adjusted under 35 U.S.C. 154(b) by 150 days.

(21) Appl. No.: 10/636,091

(22) Filed: Aug. 7, 2003

(65) Prior Publication Data

US 2005/0029423 A1   Feb. 10, 2005

(51) Int. Cl.
B23Q 11/00 (2006.01)
B23B 27/10 (2006.01)

(52) U.S. Cl. .................. 409/136; 409/234; 408/56; 279/20; 279/83

(58) Field of Classification Search ............ 279/20, 279/83; 408/56, 57, 59, 60; 409/136
See application file for complete search history.

(56) References Cited

U.S. PATENT DOCUMENTS

| | | | | |
|---|---|---|---|---|
| 4,133,545 A | * | 1/1979 | Komori | 279/83 |
| 4,453,775 A | * | 6/1984 | Clemmow | 299/81.1 |
| 4,570,952 A | | 2/1986 | Heimbigner et al. | 279/20 |
| 4,647,052 A | * | 3/1987 | Butikofer | 279/83 |
| 4,669,933 A | | 6/1987 | Dye | 409/136 |
| 4,752,088 A | * | 6/1988 | Stahl et al. | 285/148.1 |
| 4,795,292 A | * | 1/1989 | Dye | 409/136 |
| 5,311,654 A | | 5/1994 | Cook | 29/447 |
| 5,358,360 A | * | 10/1994 | Mai | 408/61 |
| 5,378,091 A | * | 1/1995 | Nakamura | 409/132 |
| 5,405,155 A | * | 4/1995 | Kanaan et al. | 279/46.7 |
| 5,405,220 A | * | 4/1995 | Ishikawa | 408/56 |
| 5,420,388 A | | 5/1995 | Girardin | 219/69.15 |
| 5,702,211 A | | 12/1997 | Roemer et al. | 408/56 |
| 5,820,313 A | * | 10/1998 | Weber | 408/56 |
| 5,975,817 A | * | 11/1999 | Komine | 409/136 |
| 5,984,595 A | * | 11/1999 | Mizoguchi | 408/57 |
| 6,116,825 A | | 9/2000 | Kammermeier et al. | 408/1 R |
| 6,210,083 B1 | | 4/2001 | Kammermeier et al. | 408/1 R |

(Continued)

FOREIGN PATENT DOCUMENTS

DE     4322552 A1 *  1/1995

(Continued)

OTHER PUBLICATIONS

International Search Report received in corresponding PCT application No. PCT/US04/25742 mailed on Oct. 12, 2005 (4 pgs).

(Continued)

*Primary Examiner*—Monica Carter
*Assistant Examiner*—Michael W. Talbot
(74) *Attorney, Agent, or Firm*—Grossman, Tucker, Perreault & Pfleger PLLC

(57) ABSTRACT

A tool holder is provided that is configured to deliver coolant to a work piece and/or a cutting tool. The tool holder includes a tool mounting aperture for receiving a shank of a cutting tool, and an axially extending central passage for receiving coolant deliver though a spindle of a machine tool. The tool holder additionally includes several coolant passages located around the tool mounting aperture for conveying the coolant from the central passage and distributing the coolant to the work piece and cutting tool. The coolant passages extend substantially parallel to the tool mounting aperture and are slightly radially spaced from the tool mounting aperture.

4 Claims, 2 Drawing Sheets

U.S. PATENT DOCUMENTS 6,394,466 B1 * 5/2002 Matsumoto et al. ........ 279/103
6,902,355 B2 * 6/2005 Kress et al. ................. 408/59

FOREIGN PATENT DOCUMENTS

| | | | | |
|---|---|---|---|---|
| DE | 19654010 A1 | * | 7/1998 | |
| FR | 2239849 A | * | 4/1975 | |
| GB | 2 266 676 A | | 11/1993 | |
| GB | 2266676 A | * | 11/1993 | |
| JP | 5-85535 | | 11/1993 | |
| JP | 10118812 A | * | 5/1998 | |
| JP | 11262839 A | * | 9/1999 | |
| JP | 11285947 A | * | 10/1999 | |
| JP | 11285948 A | * | 10/1999 | |
| JP | 11285949 A | * | 10/1999 | |
| JP | 2000015539 A | * | 1/2000 | |
| JP | 2002192441 A | * | 7/2002 | |
| JP | 2002224930 | * | 8/2002 | |
| JP | 2005103705 A | * | 4/2005 | |
| TW | 265657 | | 4/1992 | |

OTHER PUBLICATIONS

Written Opinion received in corresponding PCT application No. PCT/US04/25742 mailed on Oct. 12, 2005 (3 pgs).

English translation of Official Letter received Nov. 24, 2005, received in corresponding Taiwan application No. 93123646( 2 pgs).

English language translation of Taiwanese Office Action dated Oct. 22, 2007, issued in corresponding Taiwan patent application 93123646, 3 pages.

* cited by examiner

TOOL HOLDER

FIELD OF THE INVENTION

The present invention relates to a tool holder for a machine tool, and more particularly to a tool holder adapted to provide coolant to a work piece and cutting tool. The tool holder receives coolant from a spindle of the machine tool and directs the coolant around the cutting tool providing coolant directly to the working area of the workpiece.

BACKGROUND OF THE INVENTION

The benefit of using a coolant and/or cutting fluid for machining operations, cutting, etc. (generically referred to, herein, as machining) has long been appreciated by those having skill in the pertinent art. Coolants and cutting fluids (hereinafter simply coolants) first improve the performance of machining operation by cooling the workpiece and the cutting tool. Additionally, coolants lubricate the workpiece and cutting tool, thereby reducing frictional heat build-up. Further more, the use of coolants may also improve the removal of cut material by first inhibiting binding of the chips to the cutting tool, and further by flushing the chips of removed material from the work-site.

These effects provide several improvements to the process. The cutting force required to perform a given operation may be reduced allowing high cutting speeds to be used. Cooling of the workpiece and tool, as well as reduced frictional heating, in combination with the lower cutting force increased the life of the cutting tool. Also, the more efficient removal of cut material allows the generation of cut material at a higher rate, i.e., faster and/or deeper cutting, and also provides better control of the chips of removed material. All of these improvements facilitate an improved surface finish of the final part and increased workpiece accuracy, all while decreasing machining time.

Conventionally, coolants have been provided to a workpiece using hoses and nozzles that can be positioned manually. Such a system may generally include gooseneck hoses, or similar arrangements, originating from coolant pumps adjacent, or attached, to the machine tool. The gooseneck hoses include a nozzle on the free end thereof. The gooseneck hose may be positioned to direct a stream of coolant at a desired location on the workpiece or cutting tool.

Manually adjustable coolant systems are usually only suitable for providing relatively low pressure coolant streams. At higher pressures nozzles must be more rigidly held to prevent the nozzle from moving. However, rigidly fixing the nozzles increase the difficulty and time required to manually reposition the nozzle. Unfortunately, low pressure coolant streams are not as efficient for chip removal, and the flow rate of coolant through a given nozzle is also lower thereby reducing the available cooling capacity of the system. Penetration of coolant is also, at least somewhat, related to coolant pressure. Lower pressure coolant streams, therefore, have a lower ability to penetrate a cutting site.

For larger cutting envelopes numerous and frequent adjustments of the coolant streams are necessary to maintain the supply of coolant to the general vicinity of the cutting site. Repositioning of the coolant nozzles requires stopping the cutting operation and manually adjusting the gooseneck hose and nozzle to direct the coolant stream to the new desired location. Such repetitive stopping of the cutting process can greatly increase the time required to produce a finish article. Frustration resulting from such delays may often temp machine operators to reposition the coolant nozzles while the machine tool is still operating. The dangers of such practice are obvious.

Furthermore, coolant systems relying on manually positioned coolant nozzles reduce the benefits of modern automated machining. While the cutting path is computer controlled and does not require intervention by the operator, keeping the coolant directed to the cutting site may require the constant attention of an operator.

More recently, cooling systems have been developed that supply coolant to a cutting tool holder or chuck. Coolant may be supplied either through the spindle of the machine tool or from a collar fitted around the tool holder. Generally these systems provide coolant streams that are aimed at the cutting tool. However, such configurations result in the splashing coolant off of the cutting tool, and/or dispersing coolant from the centrifugal force of the rotation cutting tool. The end result is ineffective delivery of coolant to the working site. Also, such coolant delivery systems usually rely on complicated networks of cross passages for distributing coolant to ducts for delivering the coolant. These passages often require plugs and involve complicated machining operations.

Another variety of cooling systems actually supply coolant through the tool itself, via internal coolant passages in the cutting tool. The coolant is typically supplied to the cutting tool using through the spindle coolant delivery. The coolant passages in the cutting tool convey the coolant through the cutting tool to the distal tip of the cutting tool. Accordingly, coolant is discharged from the distal tip directly to the workpiece and cutting tool. However, this is only the case when cutting with the end face of the cutting tool, or when drilling blind holes. When cutting with the side of the tool, coolant is not directed at the cutting surface. Similarly, when completing through holes, the coolant discharged from the distal end of the cutting tool simply passes through the workpiece. Furthermore, because the cutting tools are cored out to provide coolant passages therethrough, such cutting tools are weaker than conventional cutting tools. Through tool coolant cutting tools are also significantly more expensive than conventional cutting tools because of the complicated manufacturing processes required.

SUMMARY

According to one aspect, a tool holder is provided for use with a machine tool configured to provide coolant through a spindle thereof, the tool holder including a shank portion configured to be received in the spindle, wherein the shank portion includes an axially extending coolant orifice configured to receive coolant from the spindle. The tool holder further includes a tool mounting portion including an axially extending tool mounting aperture configured to receive a tool shank, and a plurality of axial coolant passages extending substantially parallel to the tool mounting aperture, wherein the coolant passages extend from the coolant orifice.

BRIEF DESCRIPTION OF THE DRAWINGS

Features and advantages of the present invention will be apparent from the following detailed description of exemplary embodiments thereof, which description should be considered in conjunction with the accompanying drawings, in which.

DETAILED DESCRIPTION

Figure 1:
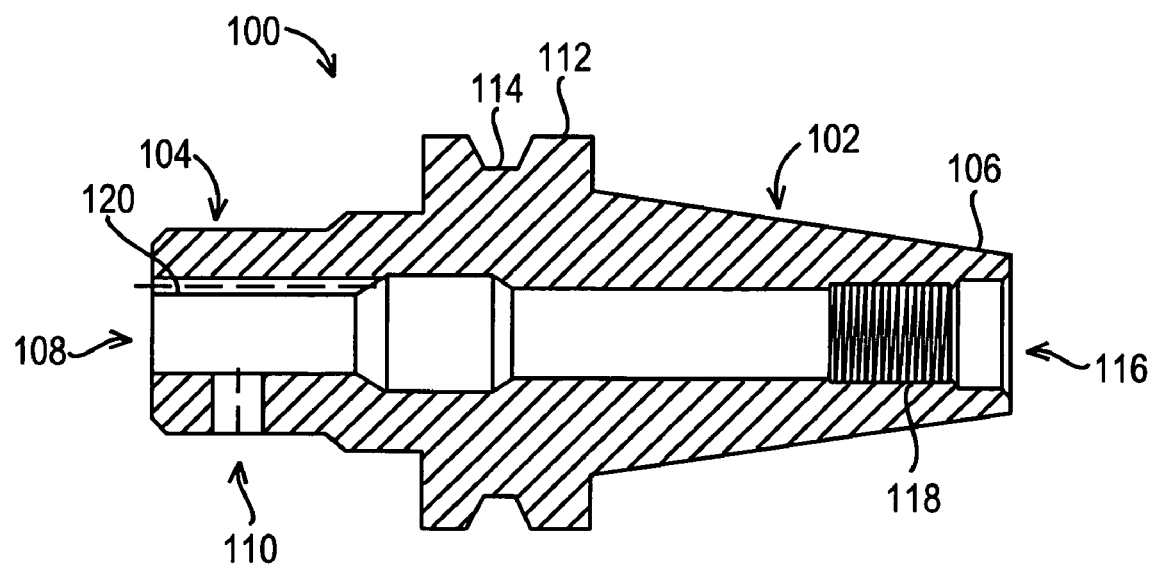
FIG. 1 is a cross-sectional view of an exemplary tool holder consistent with the present invention.

Referring to the drawings, exemplary embodiments of a tool holder consistent with the present invention are shown. The tool holder herein is configured to be used with machine tools equipped to provide "through spindle cooling". The coolant supplied from the spindle may be directed by the tool holder onto a work piece being cut as well as the tool. Herein, coolant is used to refer to coolants, cutting fluids, etc. that may be used in connection with machining operations, boring operations, cutting operations, etc. Accordingly, the tool holder of the present invention may allow coolant to penetrate to the cutting surface of a cutting tool and a work piece using conventional cutting tools, without requiring the use of expensive through tool coolant cutting tools. Furthermore, the tool holder of the present invention may be capable of providing effective cooling for side milling operations and drilling through holes. Through the cutting tool cooling is ineffective for such operations.

Referring to FIG. 1, a tool holder 100 consistent with the present invention is shown in cross section. The tool holder 100 generally includes a shank portion 102 and a tool mounting portion 104. The tool mounting portion 104 may be a generally cylindrical member. Additional configurations of the tool mounting portion 104 may also be suitable. The tool holder 100 may also include a generally circular flange 112 disposed between the shank 102 and the tool mounting portion 104. The flange 112 may include a V-groove 114 extending circumferentially around the flange 112, thereby allowing the tool holder to be used with automated tool changing system.

The shank portion 102 has a tapered outer surface 106 configured to be received in the spindle (not shown) of a machine tool in order to align the tool holder 100 with the spindle. The shank 102 includes coolant orifice 116 extending axially into the tool holder 100. The coolant orifice 116 is configured to receive coolant from the spindle. The coolant orifice 116 may include a threaded portion 118 adjacent the end of the tool holder 100. The threaded portion 118 may allow attachment of various fittings, such as retention knobs, for conveying coolant to the tool holder 100, and for retaining the tool holder 100 in the spindle.

The tool mounting portion 104 includes a tool mounting aperture 108 that is configured to receive at least a portion of the shank of a cutting tool, etc. (not shown). The tool mounting portion 104 may also include a plurality of radially extending holes 110 that are generally evenly spaced around the circumference of the tool mounting portion 104. A tool may be mounted to tool holder 100 by inserting the shank of the tool into the tool mounting aperture 108 and securing the tool therein by tightening set screws (not shown) threadably engaged in the circumferentially spaced holes against the tool shank. Those having skill in the art will, of course, recognize that alternative methods of securing the tool may be suitably used.

Figure 2:
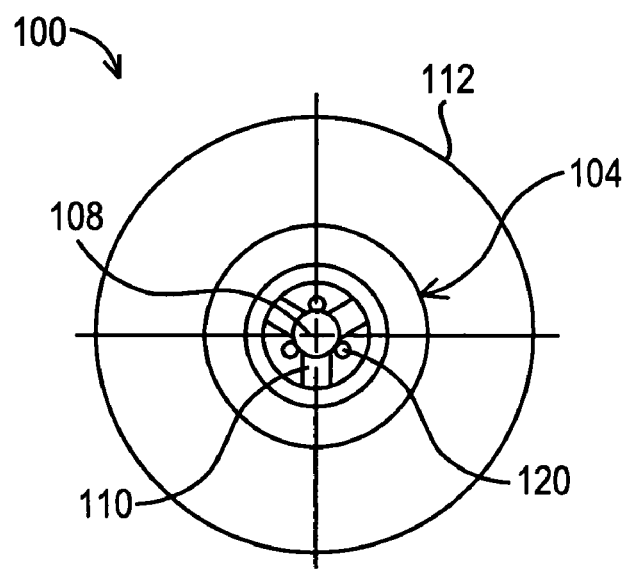
FIG. 2 is an end view of the exemplary tool holder of FIG. 1.

Referring also to FIG. 2, which shows an end view of the tool holder 100, the tool mounting portion 104 additionally includes a plurality of coolant passages 120 extending from the tool mounting portion 104 to the coolant orifice 116 of the shank portion 102, or an extension of the coolant orifice in the tool mounting portion (e.g. a portion of the tool mounting aperture 108). The coolant passages 120 depicted in this figure are generally located at equal angular intervals relative to the longitudinal axis of the tool holder 100. Equal spacing of the coolant passages 120 facilitates balancing the tool holder 100. A high degree of balance may be desirable if the tool holder 100 is to be used for high speed machining, wherein spindle speeds in the thousands and tens of thousands of revolutions per minute may be observed, in order to minimize wobble of the tool holder. However, such equal spacing is not a requirement of the present invention.

As illustrated in FIG. 2, the set screw holes 110 may be disposed between adjacent coolant passages 120. This configuration eliminates any concerns of coolant leakage, undesirable pressure drops in the coolant passages 120, and simplifies manufacturing operations.

The coolant passages 120 extend from the end face of the tool mounting portion 104 toward the shank portion 102 of the tool holder 100. The coolant passages 120 are oriented substantially parallel to the central axis of the tool mounting aperture 108. Advantageously, the coolant passages 120 are parallel to the central axis of the tool mounting aperture 108 to within one degree.

Additionally, the coolant passages 120 are radially spaced from the tool mounting aperture 108, and any cutting tool retained therein. That is, at least a thin wall of the tool mounting portion 104 exists between the tool mounting aperture 108 and the coolant passages 120. Preferable the wall thickness separating the coolant passages 120 and tool mounting aperture 108 is at least in the range of about 0.015 to 0.020 inches. Advantageously, the wall thickness may be on the order of 0.03125 to 0.0625 inches, or greater.

In operation, a cutting tool is mounted in the tool mounting aperture 108 of the tool holder 100, and the tapered shank 102 is received in the spindle of a machine tool. Pressurized coolant is provided through the spindle of the machine tool and into the coolant orifice 116 of the tool holder 100. The coolant flows through the axially extending coolant orifice 116, to the coolant passages 120, and is discharged from the distal end of the tool holder 100 as a plurality of coolant streams disposed around the cutting tool.

As noted previously, the coolant passages 120 extend substantially parallel to the tool mounting aperture 108, and therefore substantially parallel to a tool received in the mounting aperture 108. A stream of coolant discharged from the coolant passages 120 will similarly be substantially parallel to a tool mounted in the tool holder 100. The substantially parallel flow of the coolant allows improved penetration of the coolant along the length of the cutting tool. If the coolant stream is directed at the cutting tool itself, the coolant may be deflected and/or dispersed by the cutting tool, thereby reducing penetration of the coolant.

Similarly, because the coolant passages 120 are slightly spaced from the cutting tool, the coolant stream discharged from the tool holder 100 will not be significantly dispersed or disturbed by the centrifugal action resulting from contact with the cutting tool. However, because the coolant stream is only slightly spaced from the cutting tool, the coolant stream will still provide good penetration along the length of the cutting tool. The tool holder 100 may be especially suitable for face milling and side milling operations, as well as for cutting pockets. Penetration of the coolant streams may even be sufficient to provide effective cooling to allow drilling shallow to moderate depth holes.

Figure 3:
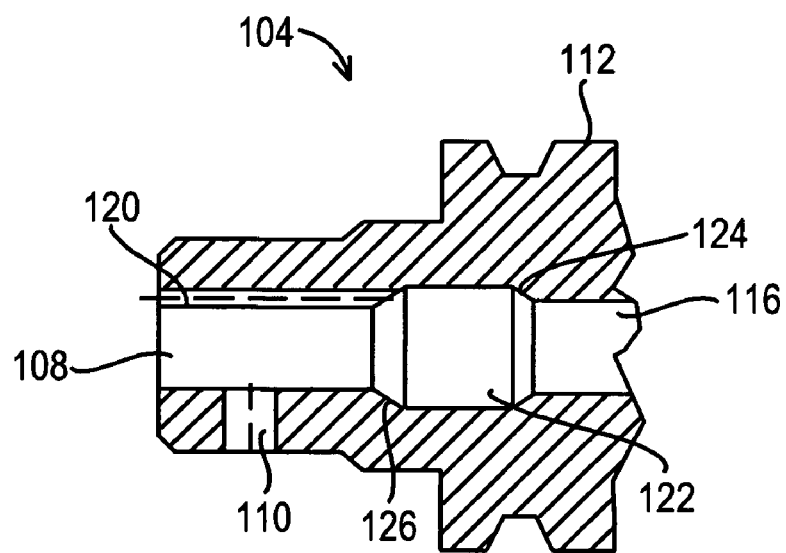
FIG. 3 is a fragmented view of the tool mounting portion of the exemplary tool holder shown in FIG. 1.

In the exemplary tool holder 100 illustrated in FIG. 1, and as shown in the fragmented view of the tool mounting portion 104 of FIG. 3, the coolant orifice 116 extending from the shank portion 102 has a diameter that is generally equal to the diameter of the tool mounting aperture 108. In order to provide coolant to the axially extending coolant passages 120, a cavity 122 may be provided between the coolant orifice 116 and the tool mounting aperture 108. The cavity 122 has an inside diameter that is at least large enough to intersect the coolant passages 120 sufficiently to permit coolant flow from the coolant orifice 116 to the coolant passages 120. Advantageously, the cavity 122 may have an inside diameter that is large enough to intersect the full diameter of each of the coolant passages 120.

The cavity 122 may be provided having tapered or angled transitions 124 and 126 between the cavity 122 and the coolant orifice 116 and tool mounting aperture 108, respectively. The transitions 124, 126 may facilitate more efficient fluid flow from the coolant orifice 116 through the coolant passages 120. As shown, the coolant passages may advantageously extend from the distal transition 126 between the cavity 122 and the tool mounting aperture 108.

Figure 4:
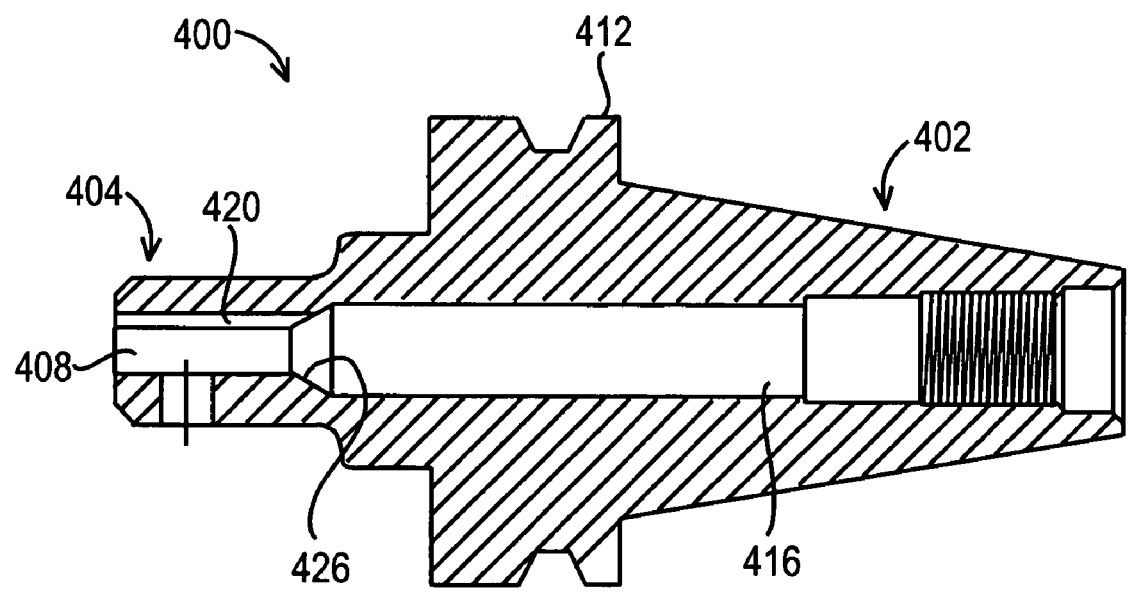
FIG. 4 is a cross-sectional view of another exemplary tool holder consistent with the present invention.

Turning to FIG. 4, another exemplary tool holder 400 consistent with the present invention is shown. As with the previous embodiment, the tool holder 400 generally includes a tapered shank portion 402 configured to be received in a spindle of a machine tool (not shown), and a tool mounting portion 404. The tool mounting portion includes a tool mounting aperture 408 configured to receive the shank of a cutting tool (not shown). A generally circular flange 412 may be disposed between the shank portion 402 and the tool mounting portion 404. The flange 412 may include a V-groove to facilitate the use of an automated tool changer.

A plurality of coolant passages 420 are disposed around the tool mounting aperture 408. The coolant passages 420 extend substantially parallel to the tool mounting aperture 408, and therefore substantially parallel to a tool that may be mounted in the tool mounting aperture 408. As with the first described exemplary embodiment, the coolant passages 420 are radially spaced from the tool mounting aperture 408, preferably by at least between 0.015-0.020 inches.

In the exemplary tool holder 400 illustrated in FIG. 4 the coolant orifice 416 extending from the shank portion 402 has a diameter that is greater than the diameter of the tool mounting aperture 408. The axially extending coolant passages 420 may, therefore, extend directly to the coolant orifice 416. Accordingly, the use of a cavity or enlarged region of the coolant orifice is not required, as it was in the previous embodiment. However, similar to the previous embodiment, the coolant passages 420 may intersect the coolant orifice 416 along a tapered transition 426. As before, such a transition may facilitate the efficient flow of coolant from the coolant orifice 416 into the coolant passages 420.

In the illustrated and described embodiments the coolant orifice and the tool mounting aperture form a continuous passage though the tool holder. However, it should be understood that this configuration is not required by the present invention. The coolant supply orifice may extend only partially toward the tool mounting aperture, and the coolant passages may extend at least to the distal end of the coolant orifice. This configuration may be used to eliminate the pressure of the coolant on an end of a cutting tool shank received in the tool mounting aperture.

While the tool holder herein has been described as being suitable for use with conventional tools, the tool holder of the present invention is also suitable for use with cutting tools configured for through tool coolant delivery, i.e., cutting tools including coolant passages extending therethrough.

Furthermore, those having skill in the art will recognize that the tool holder of the present invention may be manufactured based on a conventional tool holder, such as a tool holder adapted for through the cutting tool coolant delivery, wherein the coolant may be supplied via the machine tool spindle.

The embodiments that have been described herein are but some of the several which utilize this invention, and are set forth here by way of illustration but not of limitation. It will be appreciated by those having skill in the art that the invention herein is susceptible to numerous modifications and variations without departing from the spirit and scope of the invention. Therefore, the invention should not be limited by the description hereinabove, but rather only by the claims appended hereto.

What is claimed is:

1. A tool holder for use with a machine tool configured to provide coolant through a spindle thereof, said tool holder comprising:
   a shank portion configured to be received in said spindle, said shank portion comprising an axially extending coolant orifice configured to receive coolant from said spindle;
   a tool mounting portion comprising an axially extending tool mounting aperture configured to receive a tool shank; and
   a plurality of axial coolant passages radially spaced a distance from and extending substantially parallel to said tool mounting aperture, wherein said plurality of coolant passages are radially spaced from said tool mounting aperture between about 0.03125-0.0625 inches, said coolant passages extending directly from said coolant orifice to discharge a plurality of streams of coolant substantially parallel to, and a radially spaced distance from, a tool mounted in said tool holder, such that said plurality of streams of coolant are not aimed directly at said tool, wherein a distal end of said coolant orifice comprises a cavity having an inside diameter greater than an inside diameter of said coolant orifice and wherein a distal portion of said cavity comprises an inwardly tapered transition and said plurality of coolant passages extend from said cavity.

2. The tool holder of claim 1, further comprising a generally circular flange disposed between said shank portion and said tool mounting portion.

3. The tool holder of claim 2, wherein said generally circular flange comprises a circumferentially extending V-groove in an edge of said flange.

4. The tool holder of claim 1, said tool mounting portion further comprising at least one radially extending hole configured to receive a fastener for retaining said tool shank.

* * * * *